(12) United States Patent
Isnardi et al.

(10) Patent No.: US 8,320,729 B2
(45) Date of Patent: Nov. 27, 2012

(54) CAMCORDER JAMMING TECHNIQUES USING HIGH FRAME RATE DISPLAYS

(75) Inventors: Michael Anthony Isnardi, Plainsboro, NJ (US); Jeffrey Lubin, Princeton, NJ (US); Michael Tinker, Yardley, PA (US)

(73) Assignee: SRI International, Menlo Park, CA (US)

( * ) Notice: Subject to any disclaimer, the term of this patent is extended or adjusted under 35 U.S.C. 154(b) by 1135 days.

(21) Appl. No.: 11/943,645

(22) Filed: Nov. 21, 2007

(65) Prior Publication Data

US 2009/0129746 A1    May 21, 2009

(51) Int. Cl.
*H04N 5/91* (2006.01)
(52) U.S. Cl. .......................................... 386/94
(58) Field of Classification Search ...................... 386/94
See application file for complete search history.

(56) References Cited

U.S. PATENT DOCUMENTS

| | | | | |
|---|---|---|---|---|
| 5,293,541 A * | 3/1994 | Ito | ................................ | 348/625 |
| 6,529,600 B1 * | 3/2003 | Epstein et al. | ................ | 380/252 |
| 7,218,754 B2 | 5/2007 | Schumann et al. | | |
| 7,324,646 B1 * | 1/2008 | Burstyn et al. | ................ | 380/252 |
| 2002/0015495 A1 | 2/2002 | Kageyama et al. | | |
| 2002/0168069 A1 | 11/2002 | Tehranchi et al. | | |
| 2004/0075735 A1 * | 4/2004 | Marmaropoulos | ............. | 348/51 |
| 2006/0085534 A1 * | 4/2006 | Ralston et al. | ................ | 709/223 |
| 2007/0180254 A1 | 8/2007 | Schumann et al. | | |

OTHER PUBLICATIONS http://www.panormalabs.com/final_prototype.html.

* cited by examiner

*Primary Examiner* — Kambiz Zand
*Assistant Examiner* — Stephen Sanders
(74) *Attorney, Agent, or Firm* — Moser Taboada

(57) ABSTRACT

A method and projection system for distorting a recording of a plurality of projected frames is disclosed, comprising a high frame rate display configured to impose a modulation on the projected frames at a frequency that is above the critical fusion frequency of the human visual system, wherein the modulation is of one of shutter width relative to shutter spacing, brightness, frame period, and pseudo-rastering. The high frame rate display may be a tonal display. The projection system may further include hardware for producing low frame rate imagery; an input buffer operatively coupled to said hardware for receiving one of a serial bit stream or blocks of data so as to store at least a predetermined portion of a frame; and a sub-frame generator operatively coupled to said input buffer and to said high frame rate tonal display for applying mathematical modulation techniques to said at least a predetermined portion of a frame.

21 Claims, 10 Drawing Sheets

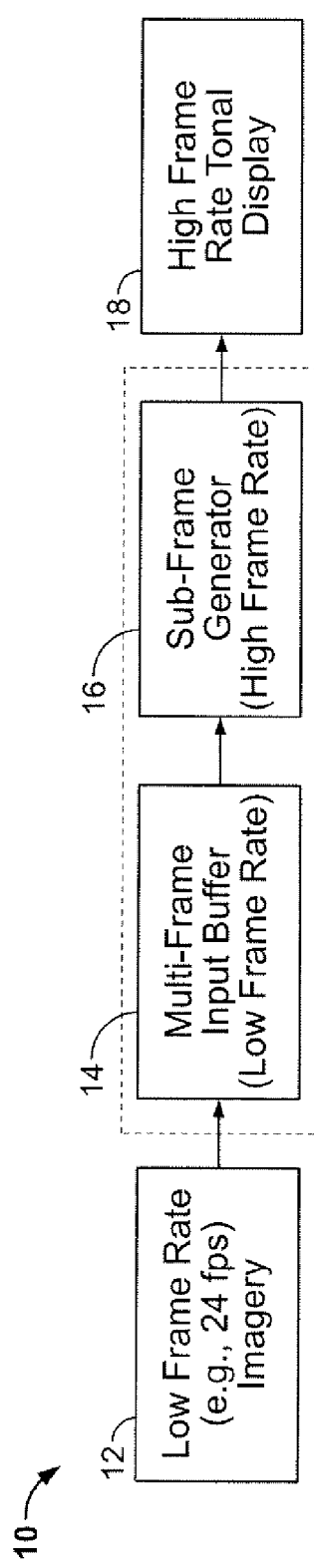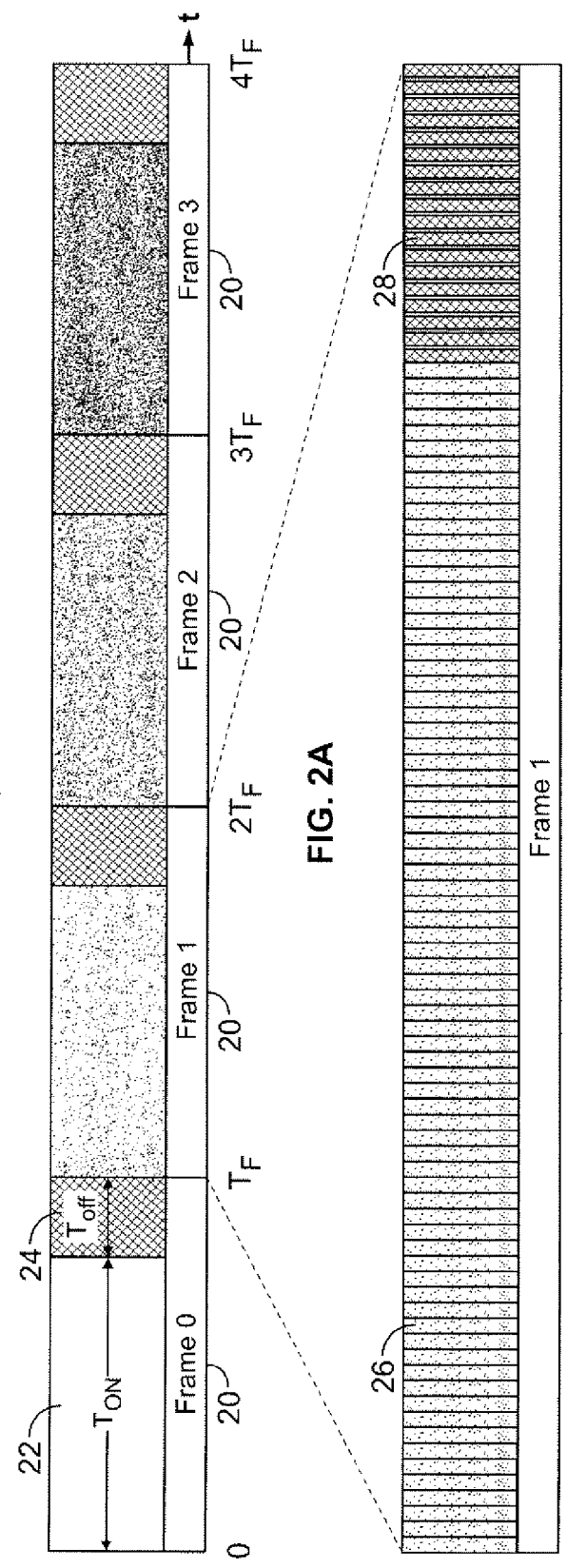
FIG. 1
FIG. 2A
FIG. 2B

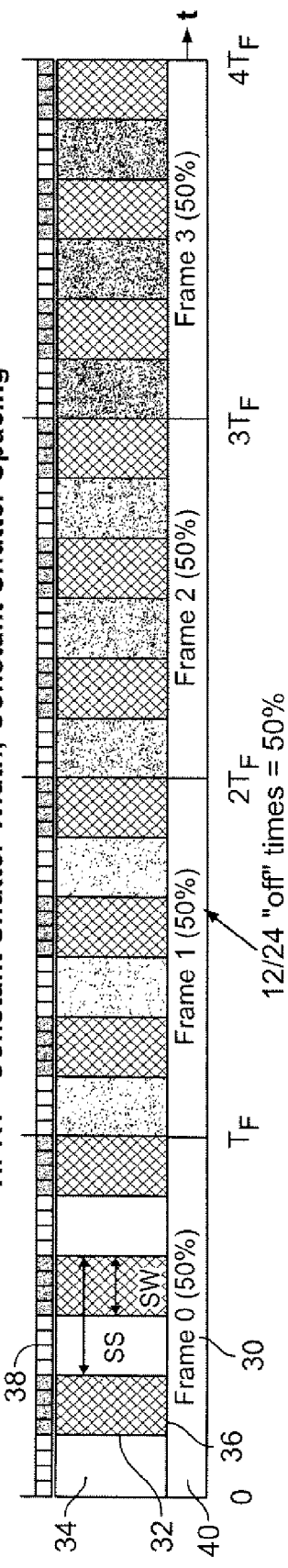
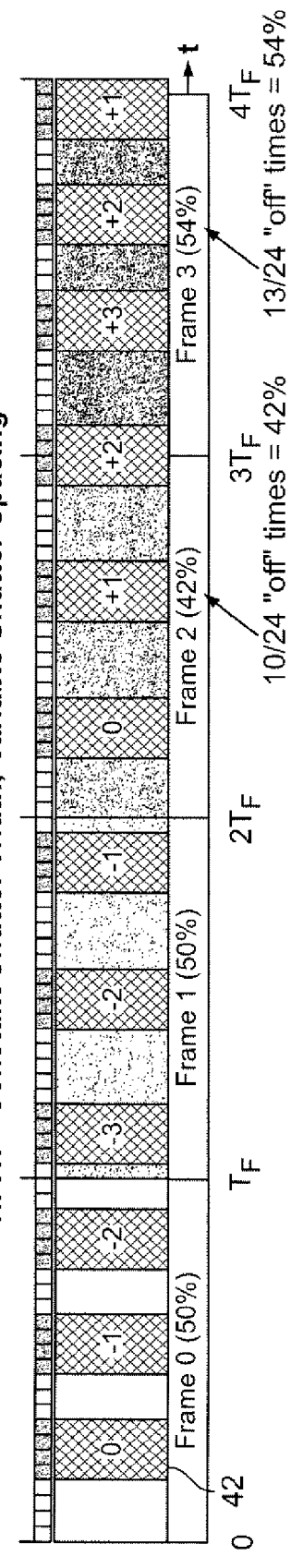
FIG. 3A
FIG. 3B

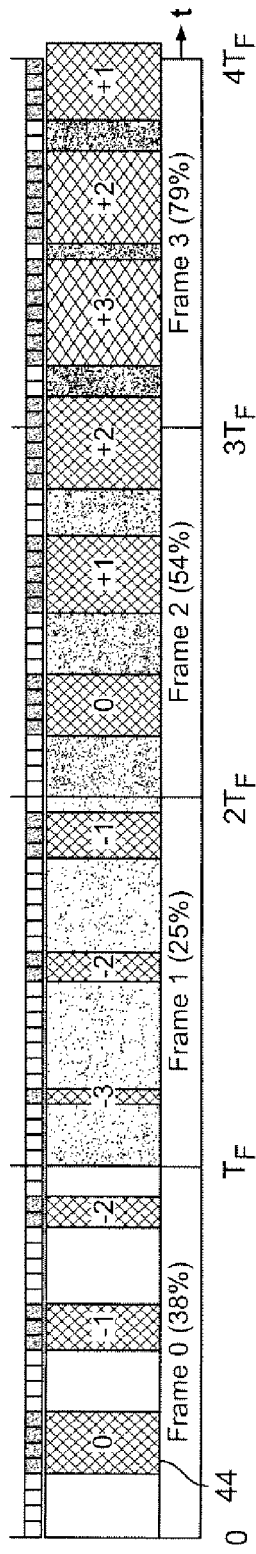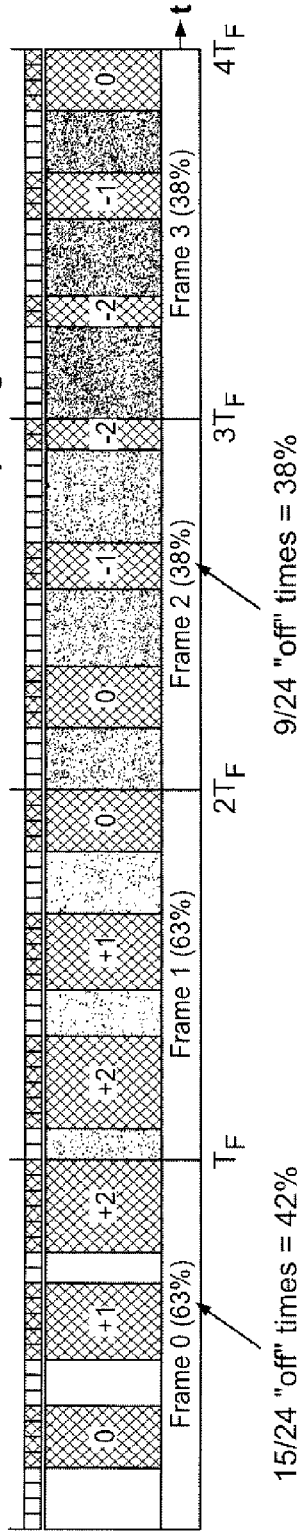

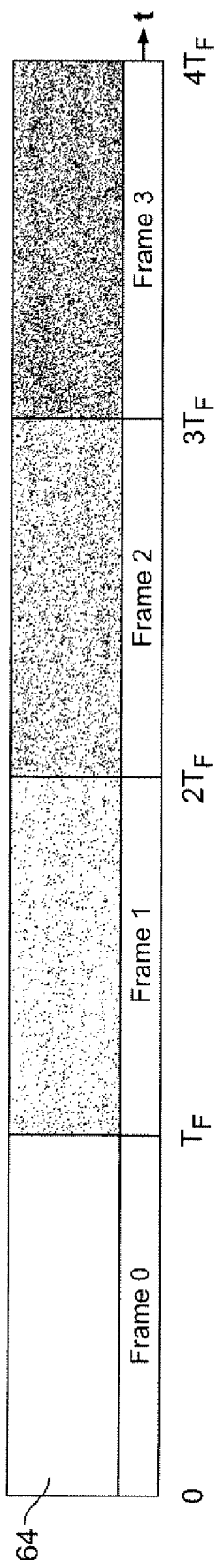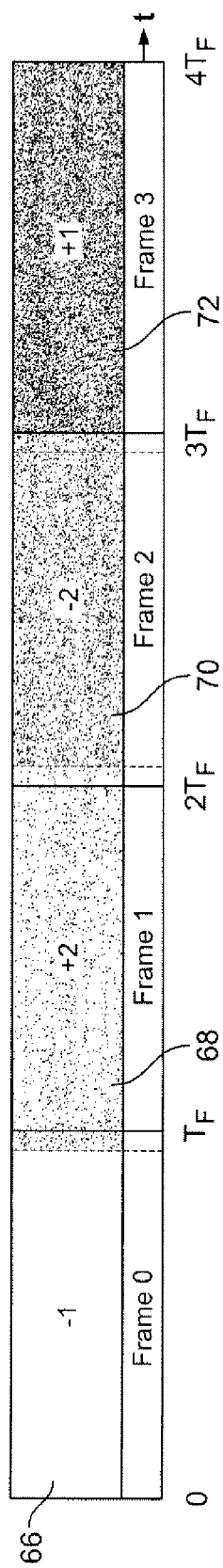
FIG. 6A
FIG. 6B

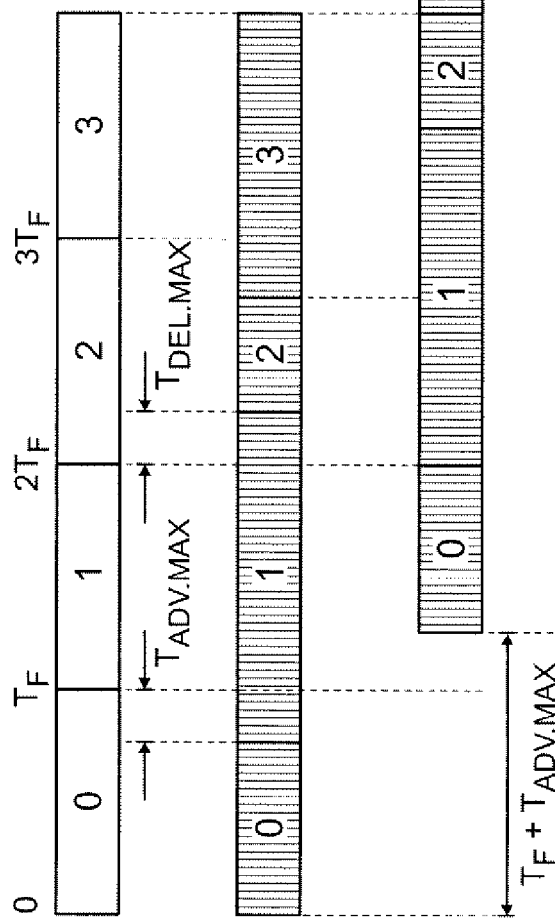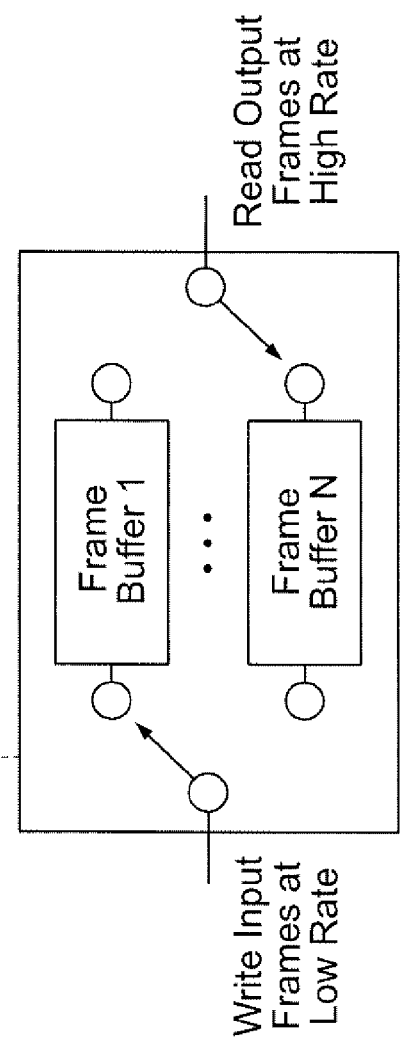
FIG. 7A
FIG. 7B
FIG. 7C
FIG. 7D

HFRT - Psuedo-Raster with Horizontal Bar Rolling Down

HFRT - Psuedo-Raster with Horizontal Bar Rolling Up

HFRT - Psuedo-Raster with Horizontal Bar Changing Directions

CAMCORDER JAMMING TECHNIQUES USING HIGH FRAME RATE DISPLAYS

FIELD OF THE INVENTION

The present invention relates to anti-piracy techniques and devices. More specifically, the present invention relates to techniques and devices for modulating projected images produced by high frame rate displays, the modulations being recordable by a camcorder but not visible to a viewing audience.

BACKGROUND OF THE INVENTION

The film industry loses millions of dollars in revenue due to the illegal copying and reselling of movies. Movie pirates illegally copy movies by capturing projected images with a video recording device, such as a camcorder. Camcorders can be used in a dark movie theater to illegally record both the projected image and the corresponding audio. The illegal copy of the image, recorded on digital media such as mini-DVs, DVDs, hard disks, or even videotape, can be repeatedly copied and sold to the public. Movie pirates often package these illegal copies in a manner to cause a purchaser to believe that a legitimate copy of the movie has been purchased.

"Camcorder jamming" techniques attempt to stop piracy at its source in movie theaters. Camcorder jamming techniques fall into two main categories: IR blasting and optical modulation. IR blasting techniques transmit infrared (IR) signals in the theater to disable a camcorder's controls or to flood the camcorder's image sensor with IR radiation to destroy the quality of the captured image. Unfortunately, film pirates can defeat IR blasting techniques by covering the IR receiver or lens of a camcorder with IR-blocking filters. Optical modulation techniques change the spatial and/or temporal patterns of displayed light in a way that is unnoticed by viewers but intentionally beats with the spatio-temporal sampling structure of camcorders.

Traditional optical modulation techniques depend upon the type of display employed in the projector. These displays are optimized to work with traditional low frequency 24 frames per second (fps) projection rate. This frame rate is high enough to induce the sensation of fluid motion in the human visual system, but is too low to prevent noticeable flicker in the human visual system (HVS). 24 Hz is below the "critical fusion frequency" of the HVS. The critical fusion frequency is the flashing rate—for most people about 40 to 50 flashes per second—above which the HVS perceives the light to be on steadily. The eye ceases to notice individual flashes but just sees a steady average value of those flashes. Displays that operate like traditional analog film projectors, which are also known as "tonal" displays, overcome this critical fusion frequency problem by "double shuttering" or "triple shuttering" each film frame so that the flicker frequency is higher than the critical fusion frequency. As a side effect, this technique also introduces beats into traditional camcorders that operate on the 30 fps NTSC/25 fps PAL television standards. However, because of its low and fixed temporal frequency, double/triple shutter technology is ineffective at universal camcorder jamming because it only induces fixed-frequency beats for certain camcorder frame rates. Notably, camcorders are now available that have a 24 fps capture mode, which would filter out disturbances that would be intentionally introduced from frame to frame.

Film projector displays are tonal displays in which the intensity during the frame period during which the light is on is proportional to the actual pixel luminance value. At every point in time during which a shutter is open, the pixel intensity will be a certain fixed value. It is very low for dark areas and it is very high for bright areas. An exemplary digital cinema display technology which operates on the tonal display principle is Silicon X-tal Reflection Displays (SXRD) and Digital Direct Drive Image Light Amplifiers (D-ILA). These displays are tonal in the sense that each pixel has an intrinsic grey scale (or tone) due to the natural attenuation characteristics of their twisted liquid crystals. Each pixel is held for the entire frame period (1/24 second) and sub-frames are not used.

Certain competing low frequency technologies are not tonal, but binary, such as the Texas Instruments Digital Light Processing (DLP) in which grey scale is produced by rapid on/off flashing of light from a tilted mirror within a sub-frame of a 1/24 second frame. Digital cinema DLP displays generally use three DLP micro-mirror devices, one each for red, blue, and green image components. If optical modulation (the on/off pattern) is changed for each repetition (i.e., within a sub-frame), then distortions can be intentionally introduced into camcorder captured video. Such techniques are the subject of U.S. Pat. No. 7,218,754 and U.S. Patent Application Publication No. US 2007/0180254 A1. For modulation in low frame rate binary displays, it is desirable to change the brightness of each pixel in some predetermined pattern throughout the duration of the frame period. In DLPs, this would mean manipulating pixel on/off values on a bit-by-bit basis. Unfortunately, in DLPs, bits can only be manipulated in groups so that even if each frame is loaded into memory as a bit pattern, there is no access to individual pixels, thereby limiting the amount of processing that can be done on a pixel by pixel basis.

In general, camcorder jamming in current low frequency analog/digital tonal/binary displays does not facilitate the addition of optical modulation patterns. Current display technologies, because of their low displayed frame rate, limit the maximum temporal modulation and greatly restrict the type of optical modulation waveform that may be carried by such a system.

Accordingly, what would be desirable, but has not yet been provided, are modulation techniques produced by cinema display hardware that can effectively defeat most if not all illegal copying of projected moving images using camcorders.

SUMMARY OF THE INVENTION

Disclosed is a method and projection system for distorting a recording of a plurality of projected frames, comprising a high frame rate display configured to impose a modulation on the projected frames at a frequency that is above the critical fusion frequency of the human visual system, wherein the modulation is one of shutter width relative to shutter spacing, brightness, frame period, and pseudo-rastering. The high frame rate display may be a tonal display. The projection system may further include hardware for producing low frame rate imagery; an input buffer operatively coupled to said hardware for receiving one of a serial bit stream or blocks of data so as to store at least a predetermined portion of a frame; and a sub-frame generator operatively coupled to said input buffer and to said high frame rate tonal display for applying mathematical modulation techniques to said at least a predetermined portion of a frame.

In one embodiment, the high frame rate display is configured to impose a simulated shuttering of the plurality of projected frames, the simulated shutter having an on-time, a shutter width (off-time) and a shutter spacing (time from one on-time to the next on-time). One of the shutter width, shutter spacing, and shutter width and shutter spacing can be varied. In another embodiment, the high frame rate display is configured to impose a brightness modulation having an odd-number of half cycles of variation over an integration period of the recording. In still another embodiment, the high frame rate display is configured to apply one of a 1-dimensional and 2-dimensional gating or taper function to each of the plurality of frames and moving the gating or tonal function in one of the x-dimension, y-dimension, and x and y dimension so that the modulation completes at least one cycle during a predetermined period of time to produce a pseudo-rastering effect in the recording.

SUMMARY DESCRIPTION OF THE DRAWINGS

FIG. 1 is a block diagram of an apparatus employing modulation techniques constructed in accordance with an embodiment of the present invention;

FIG. 2A is a timing diagram depicting a series of low frequency frames which mimic a mechanical, single shutter projector, produced by a high frame rate tonal (HFRT) display;

FIG. 2B is a timing diagram depicting how an HFRT display can take a low frequency frame of FIG. 2A and divide it into a large plurality of sub-frames;

FIG. 3A depicts a timing diagram of an HFRT display mimicking a triple shutter analog film projector;

FIG. 3B is a timing diagram depicting a constant shutter width/variable shutter spacing shutter modulation technique produced by the apparatus of FIG. 1, in accordance with an embodiment of the present invention;

FIG. 3C is a timing diagram depicting a variable shutter width/variable shutter spacing shutter modulation technique produced in accordance with an embodiment of the present invention;

FIG. 3D is a timing diagram depicting a variable shutter width/constant shutter spacing shutter modulation technique produced in accordance with an embodiment of the present invention;

FIG. 6A is a timing diagram depicting the output of a nominal display that is locked to a constant frame period, produced by the apparatus of FIG. 1, in accordance with an embodiment of the present invention;

FIG. 6B is a timing diagram depicting a frame rate modulation technique produced in accordance with an embodiment of the present invention;

FIG. 7A is a timing diagram depicting an exemplary 4-frame input period in the context of the amount of delay versus frame buffering needed to implement the method of FIG. 6B;

Figure 8A:
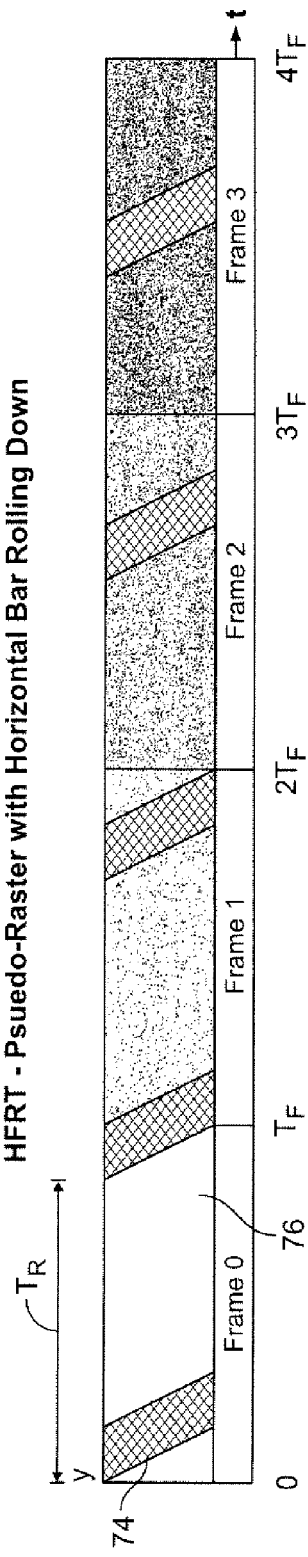
Figure 8B:
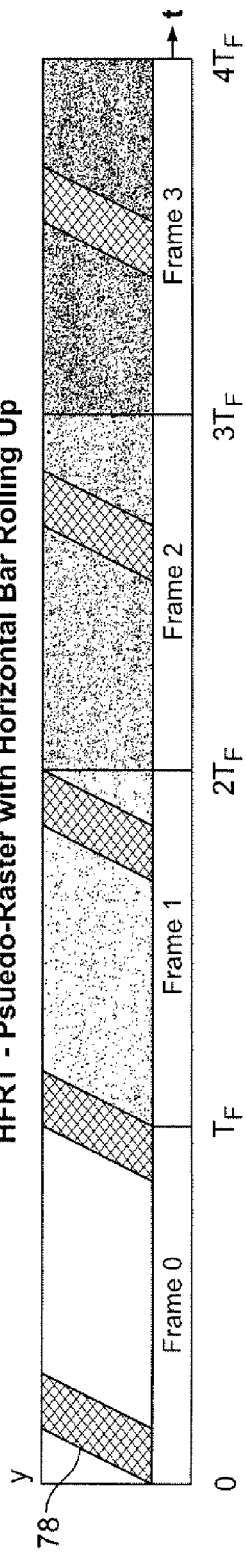
Figure 8C:
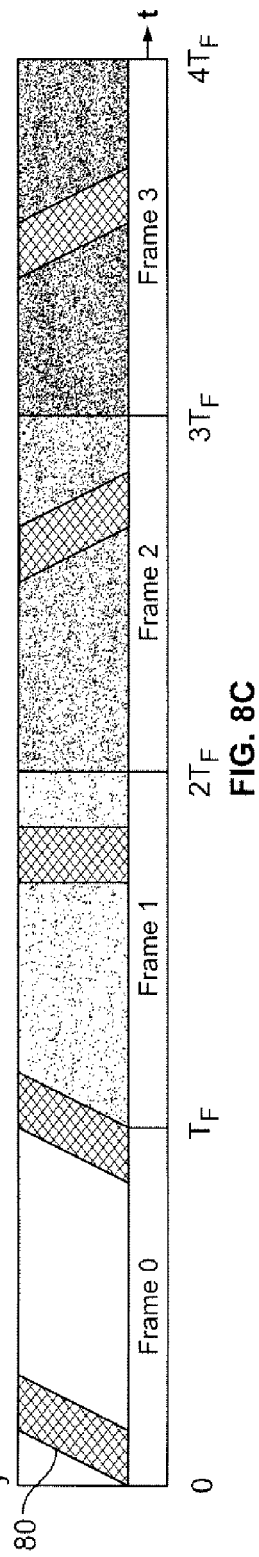
Figure 9A:
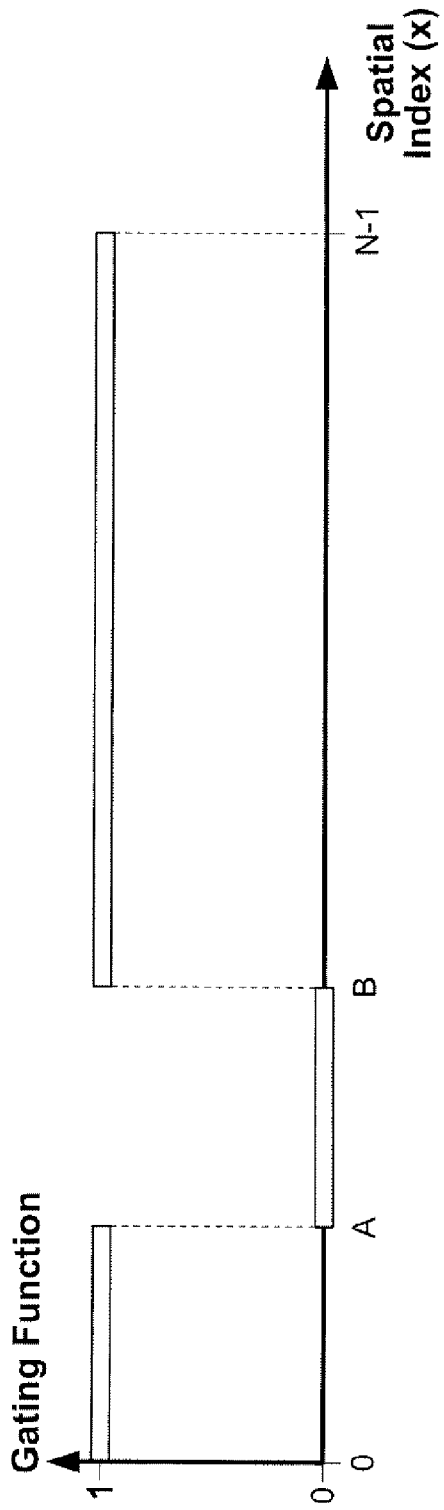
Figure 9B:
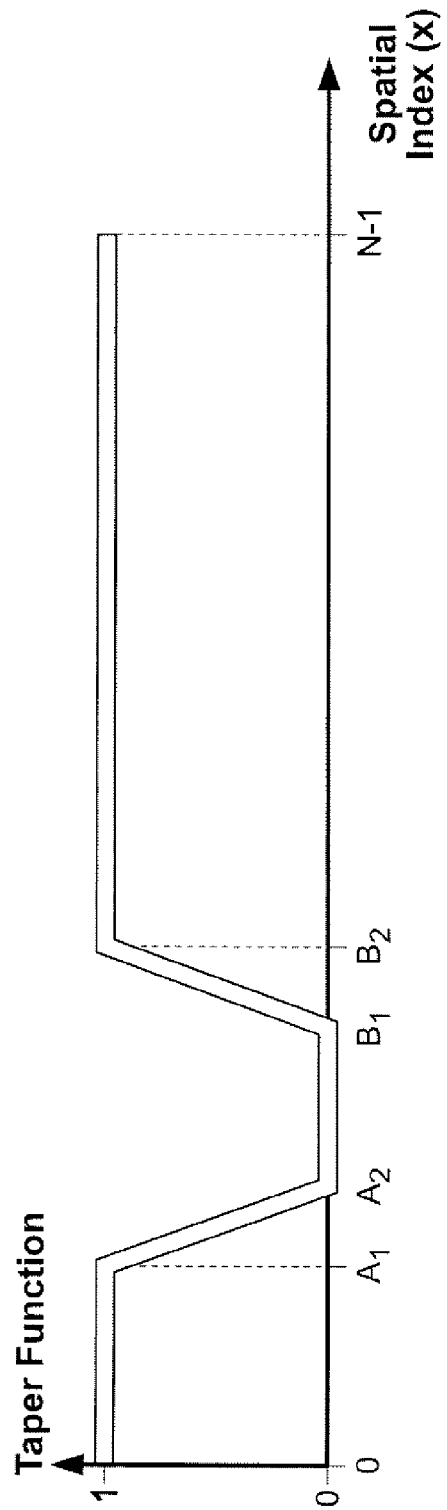

FIG. 7B is a timing diagram depicting a desired shortening of frame periods 0 and 2 and stretching frame periods 1 and 3, relative to their nominal ¹⁄₂₄ sec periods;

FIG. 7C is a timing diagram depicting the output of a frame buffer according to the method of FIG. 6B;

FIG. 7D is a block diagram showing an N-frame buffer apparatus in which input frames are written at their nominal low frame rate (24 Hz) and read out at a high frame rate (e.g., 24,000 Hz);

FIG. 8A is a timing diagram depicting a pseudo-raster modulation technique produced by the apparatus of FIG. 1, in accordance with an embodiment of the present invention, in which horizontal bars are made to appear rolling down in a captured video;

FIG. 8B is a timing diagram depicting a pseudo-raster modulation technique produced in accordance with an embodiment of the present invention, in which horizontal bars are made to appear rolling up in a captured video;

FIG. 8C is a timing diagram depicting a pseudo-raster modulation technique produced in accordance with an embodiment of the present invention, in which horizontal bars are made to appear to change direction in a captured video;

FIG. 9A is a diagram of sample gating function used to implement the pseudo-raster modulation techniques of FIGS. 8A-8C; and FIG. 9B is a diagram of sample taper function used to implement the pseudo-raster modulation techniques of FIGS. 8A-8C.

DETAILED DESCRIPTION OF THE INVENTION

The following embodiments are intended as exemplary, and not limiting. In keeping with common practice, figures are not necessarily drawn to scale.

Referring now to FIG. 1, a block diagram of an apparatus 10 employing modulation techniques of the present invention is depicted. The apparatus 10 can include a hardware block 12 for producing low frame rate imagery (e.g. 24 fps). The low frame rate images, which can be a serial bit stream or blocks of data, can be fed into a multi-frame input buffer 14 at the low frame rate. The multi-frame input buffer 14 needs to contain enough memory to store a small plurality of frames A, preferably two or three, so that modulation operations can be performed that may require displaying a frame "before" it would have normally been displayed (see discussion below). For example, if a low frequency frame contains a known dimension of horizontal pixels X, a known dimension of vertical pixels Y, and a known number of bits per pixel Z, then the amount of memory needed for the multi-frame input buffer is about 3*X*Y*Z*A (bits), where the factor 3 accounts for three color components (e.g., RGB). The multi-frame input buffer 14 needs to be processed in real time, so that it is likely to be implemented as a portion of available solid state dynamic RAM.

The apparatus 10 can also include a sub-frame generator 16 operating at a high frame rate, taking the output of the multi-frame input buffer 14 as input, the high frame rate being on the order of 10 to 1000 times the input frame rate. The high frame rate is needed for applying mathematical modulation techniques to very small portions of a low frequency input frame. Mathematical operations, to be described hereinafter, can include multiplication of pixel values by a certain factor, and either adding or subtracting an offset value. Such mathematical transformations can be performed by a processor, such as a digital signal processor, or can be implemented as an application specific integrated circuit (ASIC) or a field programmable gate array (FPGA).

The apparatus 10 can also include a high frame rate tonal (HFRT) display 18 capable of displaying bit patterns in a tonal (grey scale) fashion as described above at a high frequency frame rate. Referring now to FIGS. 1 and 2A, a series of low frequency input frames 20 produced by the hardware block 12 are depicted. The low frequency frames 20 mimic a mechanical, single shutter projector, which include an on time 22 for displaying an image, and an off time 24 per frame where the output is essentially "turned off", thereby mimicking an analog film projector shutter. Referring now to FIGS. 1 and 2B, the high frame rate tonal display 18 can take the low frequency frame outputted by the hardware block 12 and divide it into a plurality (dozens, hundreds, or thousands) of sub-frames 26, 28, corresponding to the on time 22 and off time 24, respectively, of FIG. 2A. Thus, the projected frame rate of the present invention can be much higher than the input frame rate. Such high frame rate tonal displays are currently being developed by Panorama Labs of Perth, Western Australia (at web site http://www.panoramalabs.com/final_prototype.html). The displays employ Magneto Photonic Crystals that can change state 1000 times faster than DLPs and 1,000,000 faster than liquid crystals. The present invention is not specifically limited to high frame rate tonal displays, but can be applicable to digital displays, such as a hardware block 12 implemented as a DLP, by the application in the sub-frame generator 16 of optical dithering to create the sensation of tonal frames at rates much higher than today's projectors.

Referring now to FIGS. 3A-3D, a variable shutter modulation technique produced by the apparatus 10 of FIG. 1, in accordance with an embodiment of the present invention is depicted. FIG. 3A depicts an HFRT mimicking a triple shutter analog film projector. Displayed is a plurality of frames 30, each having a plurality of subframes 32, comprising an "on" time 34, in which an image is displayed, and an "off" time 36, in which a dark image is projected. Each of the frames 30 has the same frame period $T_F$ along an axis of time t, where the frames 30 begin on integer multiples of the frame period 0, $T_F$, $2T_F$, $3T_F$, $4T_F$, etc. Each of the frames are further divided into a plurality of fractions of a frame period 38 in units of 1/24 frame period. The frame number, "Frame 0, Frame 1, Frame 2" etc., is depicted in each of the bars 40 corresponding to the duration of one of the frames 30. The percentage "off-time" is shown in parentheses, which compares the ratio of the "shutter width" labeled "SW" or "off-time" to the "shutter spacing" labeled "SS", which is the spacing between the start of two successive "on-times". FIG. 3A shows an exemplary case of constant shutter width and constant shutter spacing (CSW/CSS). Current digital cinema displays are CSW/CSS displays. Humans who have viewed movies are accustomed to CSW/CSS shuttering and it is assumed that any shutter spacing that is similar to double or triple shuttering is also acceptable to human viewers. CSW/CSS shuttering is used as a baseline herein for camcorder jamming comparisons. The CSW/CSS example in FIG. 3A has an off time percentage of 50% for each frame. As a result, there is no modulation produced in a video captured by a camcorder if it is assumed that the camcoder records at and the projector HFRT displays at the same number of frames per second, say 24 frames per second.

An HFRT is capable of producing nearly infinite variable shutter width (VSW) and/or variable shutter spacing (VSS). FIG. 3B depicts CSW/VSS in which the shutter width is kept constant but the shutter spacing diverges from a nominal value. The numbers in the SW periods 42 (e.g. −3) indicate the relative offset of the SW period with respect to the CSS, in units of 1/24 frame period. A negative number indicates advance; a positive number indicates delay. In FIG. 3B, the SS is varied in an approximately sinusoidal fashion, which serves to vary the amount of off time in an input frame period. As a result, if a film pirate were to use a camcorder that captured at that worst case frame capture rate of 24 frames per second, a lightening and darkening 6 Hz beat pattern would be introduced into a 24 Hz captured video. The variation of the CSW/CSS technique of FIG. 3B is not limited to a sinusoidal variation, but can be any type of periodic variation, including a random variation.

FIG. 3C shows VSW/VSS in which both the shutter width and the shutter spacing is varied. The numbers in the SW periods 44 (e.g., −3) indicate the relative width of the SW period with respect to the case of CSS in units of 1/24 frame period. A negative number indicates a shrinkage of the SW period; a positive number indicates a stretch. Assuming a sinusoidal-like variation, and compared to the CSW/VSS case of FIG. 3B, the off time percentage modulation varies from a low of about 25% to a high of about 79% over four frames. As a result, an even larger lightening and darkening 6 Hz beat pattern is observed by a camcorder recoding at 24 fps. Like the CSW/VSS technique of FIG. 3B, the variation of the CSW/CSS technique of FIG. 3C is not limited to a sinusoidal variation, but can be any type of periodic variation, including a random variation. Another variation of the shutter width/shutter spacing technique is VSW/CSS depicted in FIG. 3D. Still another variation would include increasing (decreasing) the brightness of "on-time" sub-frames so as to compensate for longer than normal "off-time" sub frames in FIG. 3C to "average" the overall brightness of a scene, thereby preventing the audience from noticing brightness modulations.

Figure 4A:
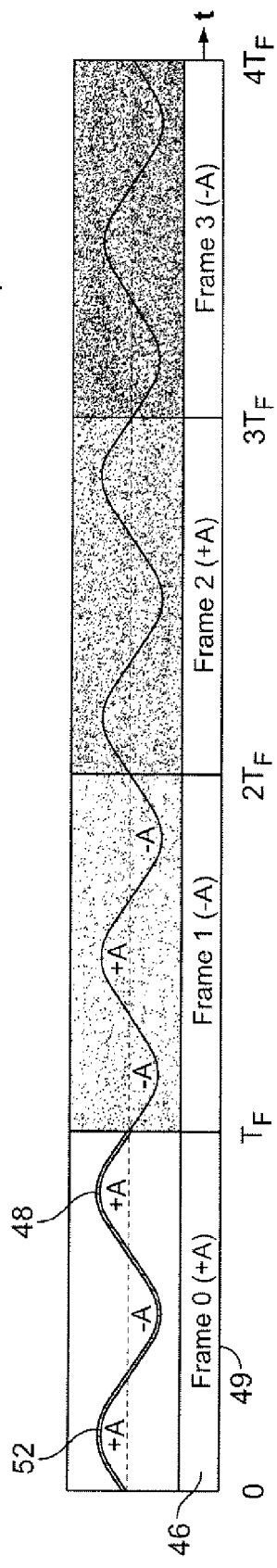
FIG. 4A is a timing diagram depicting a tonal modulation technique produced by the apparatus of FIG. 1, in accordance with an embodiment of the present invention, in which a 24 Hz camcorder is jammed with a 36 Hz tonal modulation.
Figure 4B:
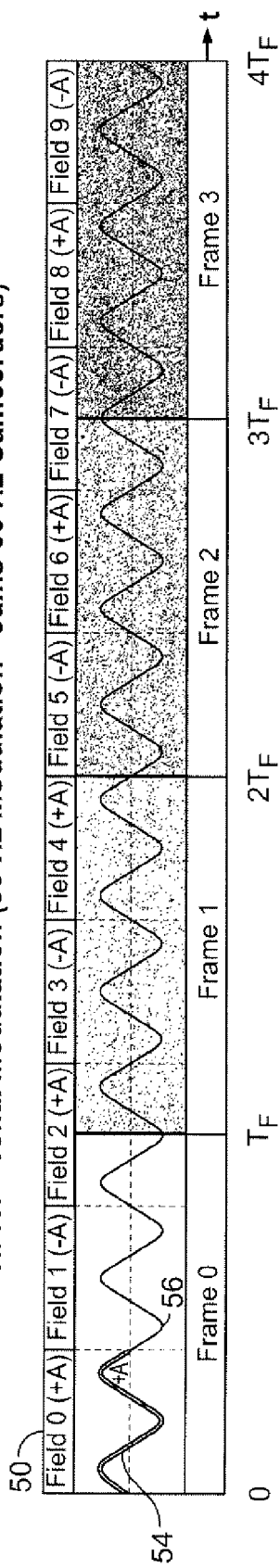
FIG. 4B is a timing diagram depicting a tonal modulation technique produced in accordance with an embodiment of the present invention, in which a 60 Hz camcorder is jammed with a 90 Hz tonal modulation.
Figure 4C:
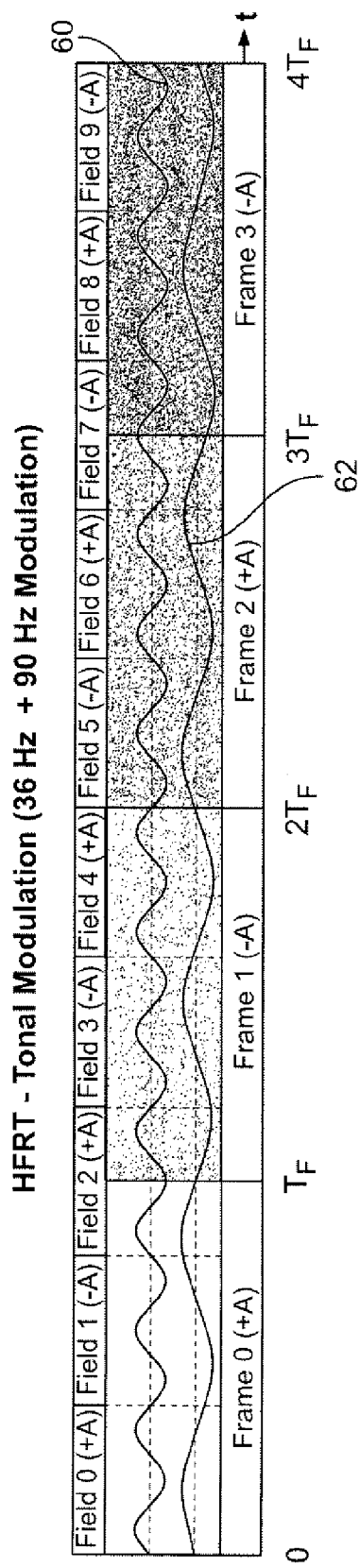
FIG. 4C is a timing diagram depicting a tonal modulation technique produced in accordance with an embodiment of the present invention, in which a combination of 36 Hz and 90 Hz tonal modulation is employed.

Referring now to FIGS. 4A-4C, a tonal modulation technique produced by the apparatus 10 of FIG. 1, in accordance with an embodiment of the present invention is depicted. Unlike the variable shutter modulation technique of FIGS. 3A-3D, where a portion of each frame has an "off" time, in FIGS. 4A-4C, light stays "on" constantly during each of the frame periods 46. Instead, a brightness modulated waveform 48 is superimposed at each pixel location. The brightness of an input pixel is varied in a wavelike (e.g., sinusoidal) fashion over an input frame period 46. In FIGS. 4A-4C, the bottom bar 49 labeled "Frame X" is the nominal frame period (e.g., 1/24 second). In FIG. 4A, the bottom bars 49 also represent the integration period of a 24-Hz camcorder that is locked to the input frame rate. In FIGS. 4B and 4C, additional bars 50 labeled "Field Y" are shown. The bars 50 represent the integration period of a 60 fields/sec camcorder but can be generalized to represent a camcorder integration period. Portions of waveforms 52, 54 of the sinusoidally varying brightness waveform 48, 56 in FIGS. 4A and 4B depict brightness variations over an odd number of half cycles of the recording camcorder. Since the brightness is being integrated or averaged by the camcorder, the area A under the portions of waveforms 52, 54 is non-zero over fixed non-overlapping time periods, which introduces a visible beat pattern in the camcorder output. If this net positive or negative brightness change repeats at a rate that is above the critical fusion frequency, then it will not be noticeable to a viewing audience.

The waveform 48, 56 can be non-sinusoidal, periodic, or non-periodic, so long as the net average brightness varies at a frequency rate that varies from frame to frame above the critical fusion frequency. This variation can be generalized by Equation 1 below:

$$O(x,y;m)=I(x,y;n)+f(x,y;m) \quad (1)$$

where x and y are spatial indices of a pixel, m is the projected (output) sub-frame index, n=floor (m/M) is the input frame index, M is the number of sub frames per input frame, I( ) and O( ) are the input and output intensity values, respectively, and f( ) is the time varying modulation function.

The net offset brightness is proportional to A, the area under a half cycle. Lower tonal modulation frequencies produce larger brightness offsets, because A is larger for lower frequencies. Since lower tonal frequencies are more visible to humans, there is a tradeoff between flicker visibility and jamming ability (the amplitude of the captured beat pattern). If the frequency of the net variation in brightness is too high, then the net area A will be so small that the amplitude of the captured beat pattern may not be visible in the captured video.

Table 1 shows optimal jamming frequencies for each camcorder capture rate. The frequencies underlined produce the maximum amplitude beat patterns in the captured video, the frequencies being just above the critical fusion frequency. The camcorder capture rates shown in Table 1 are those that are most commonly used around the world.

TABLE 1

| CAMCORDER CAPTURE RATE (HZ) | HFRT JAMMING FREQUENCIES (HZ) |
|---|---|
| 24 frames/sec progressive scan | 12, 36, 60, 84, 108, ... |
| 25 frames/sec progressive scan | 12.5, 37.5, 62.5, 87.5, 112.5, ... |
| 30 frames/sec progressive scan | 15, 45, 75, 105, 135, ... |
| 50 fields/sec interlaced | 25, 75, 125, 175, 225, ... |
| 60 fields/sec interlaced | 30, 90, 150, 210, 270 |

To jam a camcorder that captures fields or frames at F Hz, the jamming frequency of the net variation in brightness should be at or near f=(J/2)F, where J is an odd number. In addition, f=(J/2)F should be greater than about 60 Hz to avoid visible flicker to viewers in a movie theater. Therefore, for each camcorder capture rate F, J should be chosen to be the smallest number that makes f=(J/2)F above the critical fusion frequency of the human visual system, which is about 60 Hz.

Figure 5:
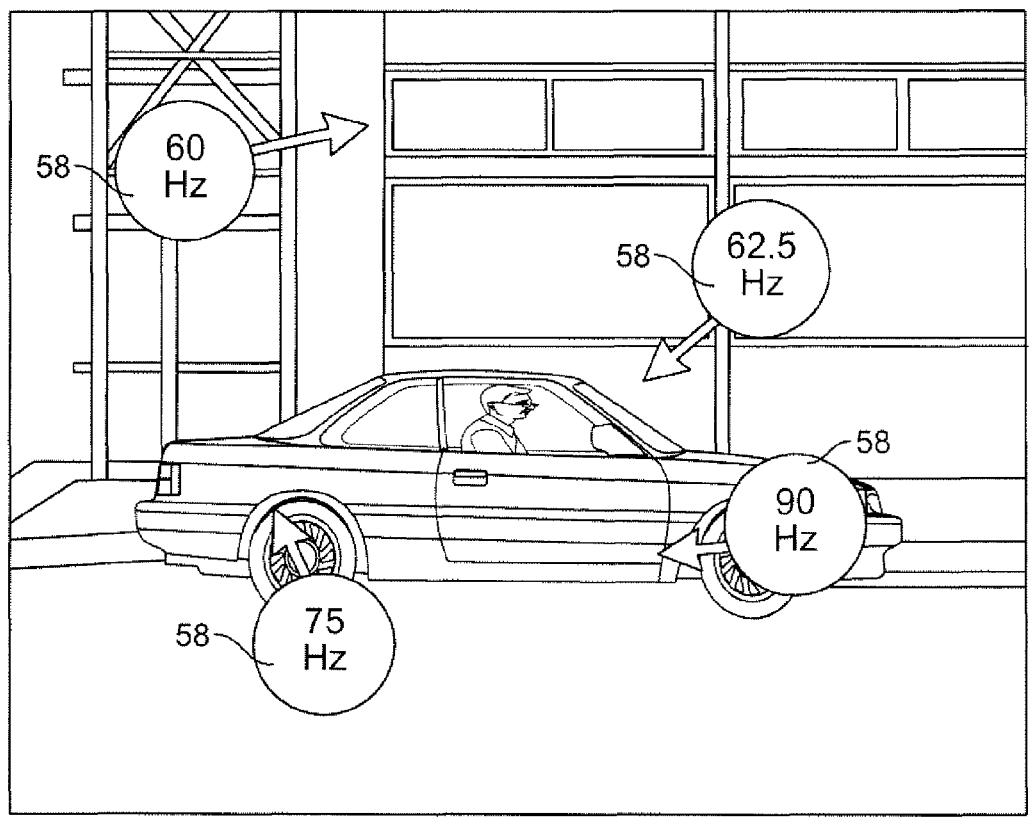
FIG. 5 depicts a plurality of jamming frequencies being projected in the viewed image simultaneously either in a fixed pattern or in moving patterns according to the tonal modulation techniques of FIGS. 4A-4C.

The tonal modulation technique of the present invention is subject to numerous variations. For instance, since it is not known which camcorder capture rate will be used in a theater, it may be desirable to jam several camcorder capture rates simultaneously. From the underlined frequencies in Table 1, there need to be four different jamming signals/frequencies: 60 Hz, 62.5 Hz, 75 Hz, and 90 Hz. Referring to FIG. 5, a plurality of jamming frequencies can be projected in the viewed image simultaneously either in a fixed pattern or in moving patterns such as the spotlights 58 shown. Referring now to FIGS. 4C and 5, although it may be possible to add two or more waveform frequencies 60, 62 in the same spatial region/pixel, care needs to be taken that these waveforms are phased relative to each other so as not to produce constructive interference, which may be noticeable to the viewing audience. In a preferred embodiment as shown in FIG. 5, the spotlights 58 do not overlap. A key object of interest in the scene can be tracked (e.g., a human face) and associated with the jamming region. The amplitude of the jamming frequency can be varied over time to produce a variable amplitude beat pattern. The jamming region can be shaped to that it produces recognizable characters or symbols (e.g. ©, the universal NO symbol, or the word COPY) in the captured video.

In all variations in which the jamming region is localized to a spatial region of the scene, the edges of the jamming region should be smoothly tapered to avoid large and possible visible discontinuities with the unjammed regions.

Referring now to FIGS. 6A and 6B, a frame rate modulation technique produced by the apparatus 10 of FIG. 1, in accordance with an embodiment of the present invention is depicted. Frame rate modulation refers to varying the frame rate period in either a regular or pseudo-random fashion. The video equipment of some pirates, in order to get the best possible reproduction onto their videotape, may have the capability of locking its capture rate to the displayed frame rate. In theory, this could be done with a standard film projector or a DLP projector in which each frame lasts exactly $1/24^{th}$ of a second. If the frame period of the HFRT display is varied in either a regular or pseudo-random fashion, a phase lock loop within the pirate's video equipment would have difficulty locking on to the displayed frame rate of the projected video.

FIG. 6A shows the output of a nominal display that is locked to a constant frame period, say $1/24$ th second. A frame 64 is displayed for its entire timeslot with no shuttering, as in an LCD display. FIG. 6B shows a plurality of frames, 66, 68, 70, 72, whose time periods vary by a fraction of a time period, either retarded, advanced, or both. Frame 66 ends early by a fraction of a time period; frame 68 begins slightly early and ends slightly late; frame 70 begins slightly late and ends slightly early; and frame 72 begins early but ends on a frame boundary. Varying frame width, frame start time, and frame end time requires buffering of frames. Referring now to FIGS. 1 and 6B, the combination of the multi-frame input buffer 14 and the sub-frame generator 16 perform this task. The delay through these buffers depends on the maximum temporal advancement of an output frame relative to its associated input frame. Because of fixed buffer size, the deviations from the nominal frame rate (e.g., 24 Hz) needs to be zero on average, otherwise the multi-frame input buffer 14 can underflow or overflow.

Referring now to FIGS. 7A-7D, the amount of delay versus frame buffering needed is depicted. FIG. 7A depicts an exemplary 4-frame input period. As shown in FIG. 7B, frame periods 0 and 2 are to be shortened while frame periods 1 and 3 are to be stretched, relative to their nominal $1/24$ see periods. In particular, frame period 1 is to be temporally advanced by $T_{ADV,MAX}$ and delayed by $T_{DEL,MAX}$. FIG. 7D shows an N-frame buffer apparatus in which input frames are written at their nominal low frame rate (24 Hz) and read out at a high frame rate (e.g., 24,000 Hz). Note that an input frame takes $T_F$ sec to be written—for instance, the first pixel of frame 0 is written at t=0 and the last pixel of frame 0 is written just before t=$T_F$ (ignoring any blanking). Once a complete frame is in memory, it can be read out multiple times, in quick succession, at any desired higher output frame rate simply by reading the frame buffer quickly. Also note that reading frame N cannot happen until frame N is completely written into the buffer. In order to meet this constraint, the read-out schedule in FIG. 7B is temporally delayed by $T_F+T_{ADV,MAX}$, as shown in FIG. 7C. This ensures that frame 1, which has the largest temporal advancement, is read out as soon as it is completely written. N, which is the number of frame buffers required to implement the frame period modification, can be computed Note that the read-out schedule of frame 1 in FIG. 7C overlaps frame periods 2 and 3 in FIG. 7A. Since frame 1 is to be kept in memory (so that it can be read it out) and frames 2 and 3 stored, this example shows that 3 frame buffers are needed to implement the read-out schedule shown in FIG. 7B. In general, N can be expressed by Equation 2 as follows:

$$N=2+\lceil(T_{ADV,MAX}+T_{DEL,MAX})/T_F\rceil \quad (2)$$

where $\lceil x \rceil$ is the nearest integer $\geq x$.

Note that psychophysically, it is possible to vary the frame rate by as much as 50% and still be acceptable to human viewers. For example, films taken at 24 frames per second are converted to 60 fields per second for viewing on television, according to the NTSC standard. This conversion is performed by what is called a "3:2" pulldown process, where film frames are displayed alternatively as 3 fields (50.1 msec) and 2 fields (33.4 msec).

Referring now to FIGS. 8A-8C, a pseudo-raster modulation technique produced by the apparatus 10 of FIG. 1, in accordance with an embodiment of the present invention is depicted. FIGS. 8A-8C show the apparatus 10 mimicking a beat pattern that is known to occur when a video camera is aimed at a cathode ray tube (CRT) scanning raster. A dark horizontal bar 74 moves up or down an image depending on the relative rates of a camcorder's capture rate and the vertical refresh rate of the CRT. Humans do not notice the vertical refresh of CRT scanning rasters. For CRT monitors, a physical electron beam progressively illuminates each pixel from left to right and top to bottom every ¹⁄₆₀ th of a second (in a 60 Hz video system). A phosphor on the CRT emits a brief flash of light that immediately begins to decay. But, because of persistence of vision in the human visual system, a person does not see the pulses but sees the average DC value. This is not the case for a camcorder. By the appropriate introduction of a gating function, which turns a pixel completely black for a fraction of a second either spatially or temporally, the camcorder records a dark interval. If the gating function is such that pixels are being blacked-out one after another moving down the image, then a black bar will appear to be rolling down the image in the captured video.

A pseudo-raster "black bar" can be produced by applying a 1-dimensional (x or y dimensional) and/or 2-dimensional (x and y dimensional) taper or gating function to each frame and moving the function in the x and/or y dimension so that it completes one or more cycles during a predetermined period of time. As shown in FIGS. 9A-9B, a gating function goes from one extreme value to another over extremely short spatial distances, whereas a taper function goes between extremes gradually. A gating function can be implemented as a switch whereas a taper function requires multiplication of an input signal with a fractional value.

An example gating function is

| | |
|---|---|
| G(x) = 1, | 0 < x < A |
| G(x) = 0, | A ≤ x < B |
| G(x) = 1, | B ≤ x < N |

An example linear taper function is

| | |
|---|---|
| T(x) = 1, | 0 < x < $A_1$ |
| T(x) = $(A_2 - x)/(A_2 - A_1)$, | $A_1 \leq x < A_2$ |
| T(x) = 0, | $A_2 \leq x < B_1$ |
| T(x) = $(x - B_1)/(B_2 - B_1)$, | $B_1 \leq x < B_2$ |
| T(x) = 1, | $B_2 \leq x < N$ | where x, A, B, $A_1$, $A_2$, $B_1$, $B_2$ and N are shown in FIGS. 9A-9B.

Referring again to FIG. 8A-8C, CRT-style y-dimensional gating function is applied to the sub-frames 76 in which a top-to-bottom cycle is completed in $T_R$ seconds. If $T_R$ is not an integral multiple or sub-multiple of the camcorder's field/frame period $T_F$, then the horizontal bar 74 will appear to move up or down the image.

Referring to FIG. 8A, the horizontal bar 74 moves down the image. Reversing the gating function, as shown in FIG. 8B, causes a horizontal bar 78 to move up the image. In FIG. 8C, a horizontal bar 80 can be made to move up, stop, and then move down the image, effectively reversing direction. In another embodiment if the taper or gating function is rotated 90° so that the variation is in the x-dimension, then a vertical bar appears to move left or right in a captured video. In still another embodiment, if a taper or gating function is made to move in a diagonal direction, then a diagonal bar appears to move left or right or up or down in a captured recording. By applying an appropriate taper or gating function, one skilled in the art can appreciate that almost any type of movement of a bar can be made to appear in a recorded video.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed:

1. A method for distorting a recording of a plurality of frames, comprising the steps of:
    receiving, by a processor, a digital representation of the plurality of frames,
    imposing, by the processor, a modulation in a digital domain on the digital representation of the plurality of frames at a frequency that is above the critical fusion frequency of the human visual system;
    outputting, by the processor, a modulated digital representation of the plurality of frames to a high frame rate tonal display; and
    varying the frame rate in a pseudo-random fashion,
    wherein the modulation is one of shutter width relative to shutter spacing, brightness, frame period, and pseudo-rastering.

2. The method of claim 1, further comprising the step of imposing a simulated shuttering of the digital representation of the plurality of frames, the simulated shutter having an on-time, a shutter width (off-time) and a shutter spacing (time from one on-time to the next on-time).

3. The method of claim 2, further comprising the steps of varying one of the shutter width, the shutter spacing, and the shutter width and shutter spacing.

4. The method of claim 2, further comprising the step of varying brightness of the on-time to compensate for darkening of the digital representation of the plurality of frames due to the off-time.

5. The method of claim 1, further comprising the step of imposing a brightness modulation having an odd-number of half cycles of variation over an integration period of the recording.

6. The method of claim 5, further comprising the step of imposing one or more brightness modulations having one or more modulation rates over a one or more portions of a region covered by the digital representation of the plurality of frames.

7. The method of claim 6, wherein the one or more brightness modulations are moving across the region over time.

8. The method of claim 7, wherein the one or more modulations track one or more key objects in the digital representation of the plurality of frames.

9. The method of claim 6, further comprising the step of varying average amplitude of the one or more brightness modulations over time.

10. The method of claim 6, wherein the one or more portions of the region are formed into one of a recognizable alphanumeric character, symbol, and a combination of alphanumeric characters and symbols.

11. The method of claim 1, further comprising the step of applying one of a I-dimensional and 2-dimensional gating or taper function to each of the digital representations of the plurality of frames and moving the gating or taper function in one of the x-dimension, y-dimension, and x and y dimension so that the modulation completes at least one cycle during a predetermined period of time to produce a pseudo-rastering effect in the recording.

12. A method for distorting a recording of a plurality of frames comprising the step of imposing, using a processor, a variable frame period modulation in a digital domain on a digital representation of the plurality of frames at a frequency that is above a critical fusion frequency of the human visual system, imposing a brightness modulation having an odd-number of half cycles of variation over an integration period of the recording and outputting, by the processor, a modulated digital representation of the plurality of frames to a high frame rate tonal display.

13. A method for distorting a recording of a plurality of frames comprising the steps of:
imposing, by a processor, a modulation in a digital domain on the digital representation of the plurality of frames at a frequency that is above the critical fusion frequency of the human visual system; and
imposing, using the processor in a digital domain, one of a 1-dimensional and 2-dimensional taper or gating function to each of a digital representation of the plurality of frames and moving the taper or gating function in one of an x-dimension, y-dimension, and x and y dimension so that the modulation completes at least one cycle during a predetermined period of time corresponding to a rate that is above a critical fusion frequency of the human visual system to produce a pseudo-rastering effect in the recording, and outputting, by the processor, a modulated digital representation of the plurality of frames to a high frame rate tonal display.

14. A projection system for distorting a recording of a plurality of frames, comprising a processor for imposing a modulation in a digital domain on a digital representation of the plurality of frames at a frequency that is above a critical fusion frequency of the human visual system; and imposing a simulated shuttering of the digital representation of the plurality of frames, the simulated shutter having an on-time, a shutter width (off-time) and a shutter spacing (time from one on-time to the next on-time), wherein the modulation is one of shutter width relative to shutter spacing, brightness, frame period, and pseudo-rastering, said processor outputting a modulated digital representation of the plurality of frames to a high frame rate tonal display.

15. The projection system of claim 14, wherein an output of said processor is coupled to a high frame rate tonal display.

16. The projection system of claim 15, wherein an input of said processor is coupled to a low frame rate multi-frame input buffer.

17. The projection system of claim 15, further comprising:
hardware for producing low frame rate imagery;
said input buffer operatively coupled to said hardware for receiving one of a serial bit stream or blocks of data so as to store at least a predetermined portion of a frame; and
said processor operatively coupled to said input buffer and to said high frame rate tonal display for applying mathematical modulation techniques to said at least a predetermined portion of a frame.

18. The projection system of claim 14, wherein said processor is one of an application-specific integrated circuit, a field-programmable gate array, a microcontroller, and a digital signal processor.

19. The projection system of claim 14, wherein the processor is configured to vary one of the shutter width, shutter spacing, and shutter width and shutter spacing.

20. The projection system of claim 14, wherein the processor is configured to impose a brightness modulation having an odd-number of half cycles of variation over an integration period of the recording.

21. The projection system of claim 14, wherein the processor is configured to apply one of a 1-dimensional and 2-dimensional gating or taper function to each of the a digital representation of the plurality of frames and moving the gating or tonal function in one of an x-dimension, y-dimension, and x and y dimension so that the modulation completes at least one cycle during a predetermined period of time to produce a pseudo-rastering effect in the recording.

* * * * *